(12) United States Patent
Burrows et al.

(10) Patent No.: US 7,021,336 B2
(45) Date of Patent: Apr. 4, 2006

(54) EVEN-FLOW SEPTIC TEE ARRANGEMENT

(76) Inventors: Kenneth Burrows, 1 Pine n' Oak Dr., Wellington, Nova Scotia (CA) B2T 1J4; Mysore G. Satish, 5826 Pinehill Dr., Wellington, Nova Scotia (CA) B3H 1E5

( * ) Notice: Subject to any disclaimer, the term of this patent is extended or adjusted under 35 U.S.C. 154(b) by 0 days.

(21) Appl. No.: 10/851,421

(22) Filed: May 24, 2004

(65) Prior Publication Data

US 2005/0257845 A1 Nov. 24, 2005

(51) Int. Cl.
*F15D 1/00* (2006.01)

(52) U.S. Cl. .................... 138/39; 138/118; 285/132.1; 210/101; 405/40

(58) Field of Classification Search ........... 285/132.1, 285/129.2, 131.1, 133.11; 138/39, 115–117; 210/101, 170; 405/40, 43, 44, 47, 51
See application file for complete search history.

(56) References Cited

U.S. PATENT DOCUMENTS

| | | | | |
|---|---|---|---|---|
| 1,378,054 A | * | 5/1921 | Pratt ...................... 285/131.1 |
| 3,497,067 A | * | 2/1970 | Tyson ........................ 210/259 |
| 3,727,760 A | * | 4/1973 | Soriano et al. ............. 210/101 |
| 3,733,898 A | * | 5/1973 | Yamamoto et al. ........... 73/198 |
| 3,736,955 A | * | 6/1973 | Schlesser ................ 137/561 A |
| 3,894,302 A | * | 7/1975 | Lasater .......................... 4/696 |
| 4,293,237 A | * | 10/1981 | Robey et al. ................. 405/39 |
| 4,838,731 A | * | 6/1989 | Gavin ......................... 405/40 |
| 5,098,568 A | * | 3/1992 | Tyson ........................ 210/519 |
| 5,752,548 A | * | 5/1998 | Matsumoto et al. .......... 138/39 |
| 5,879,029 A | * | 3/1999 | Wilks ............................ 285/8 |
| 6,012,871 A | * | 1/2000 | Bryant ........................ 405/40 |
| 6,027,146 A | * | 2/2000 | Kurimoto ................ 285/131.1 |
| 6,152,650 A | * | 11/2000 | Heine .......................... 405/36 |
| 6,503,392 B1 | * | 1/2003 | Tyson ........................ 210/170 |
| 6,524,473 B1 | * | 2/2003 | Williamson ................. 210/154 |
| 6,960,321 B1 | * | 11/2005 | Ludwig ........................ 422/26 |

\* cited by examiner

*Primary Examiner*—James Hook

(57) ABSTRACT

An even-flow tee arrangement for use with a septic system consists of a tee connector having top and bottom section cemented together. The bottom section includes a splitter plate extending from the tee-shaped exit end to two pairs of directional vanes proximate the entrance end of the tee connector.

3 Claims, 3 Drawing Sheets

EVEN-FLOW SEPTIC TEE ARRANGEMENT

BACKGROUND OF THE INVENTION

Septic systems of the type connecting a septic holding tank to a distribution field often employ a tee connector between the holding tank and the perforated pipes leading to the leaching field. Other systems utilize a complex interface connection box intermediate the holding tank and the leaching field.

U.S. Pat. No. 4,838,731 entitled "Septic Tank Distribution System" describes an interface box connecting between the tank and leaching field.

U.S. Pat. No. 6,012,871 entitled "Septic Tank System and Distribution System Suitable for Use in Sloping Terrain" describes a tee connection between the tank and the leaching field, for example.

When a tee connection is employed, there is a tendency for the tee to become slightly rotated such that one side of the tee is lower than the other side causing unequal flow transfer out to the distribution pipes. The distribution pipe connecting with the lower side of the tee often causes early saturation of the associated leaching field and under-utilization of the distribution pipe connecting with the opposite side thereof.

U.S. Pat. No. 4,605,501 entitled "Flow Divider for Distribution System" describes one approach for dividing and controlling the distribution of septic tank effluent.

One purpose of the instant invention is to provide a tee connector having integral means for controlling flow thru both sides of the tee connector to insure equal flow thru the distribution pipes upon occurrence of one distribution pipe being at a lower level.

SUMMARY OF THE INVENTION

An even-flow tee arrangement for use with a septic system consists of a tee connector having top and bottom section cemented together. The bottom section includes a splitter plate extending from the tee-shaped exit end to two pairs of directional vanes proximate the entrance end of the tee connector. The directional vanes direct the fluid flow towards the splitter plate even when the tee is off level. The function of the splitter plate is to divide the fluid flow relatively evenly outwards thru the tee-shaped exit.

DESCRIPTION OF THE PREFERRED EMBODIMENT

Figure 1:
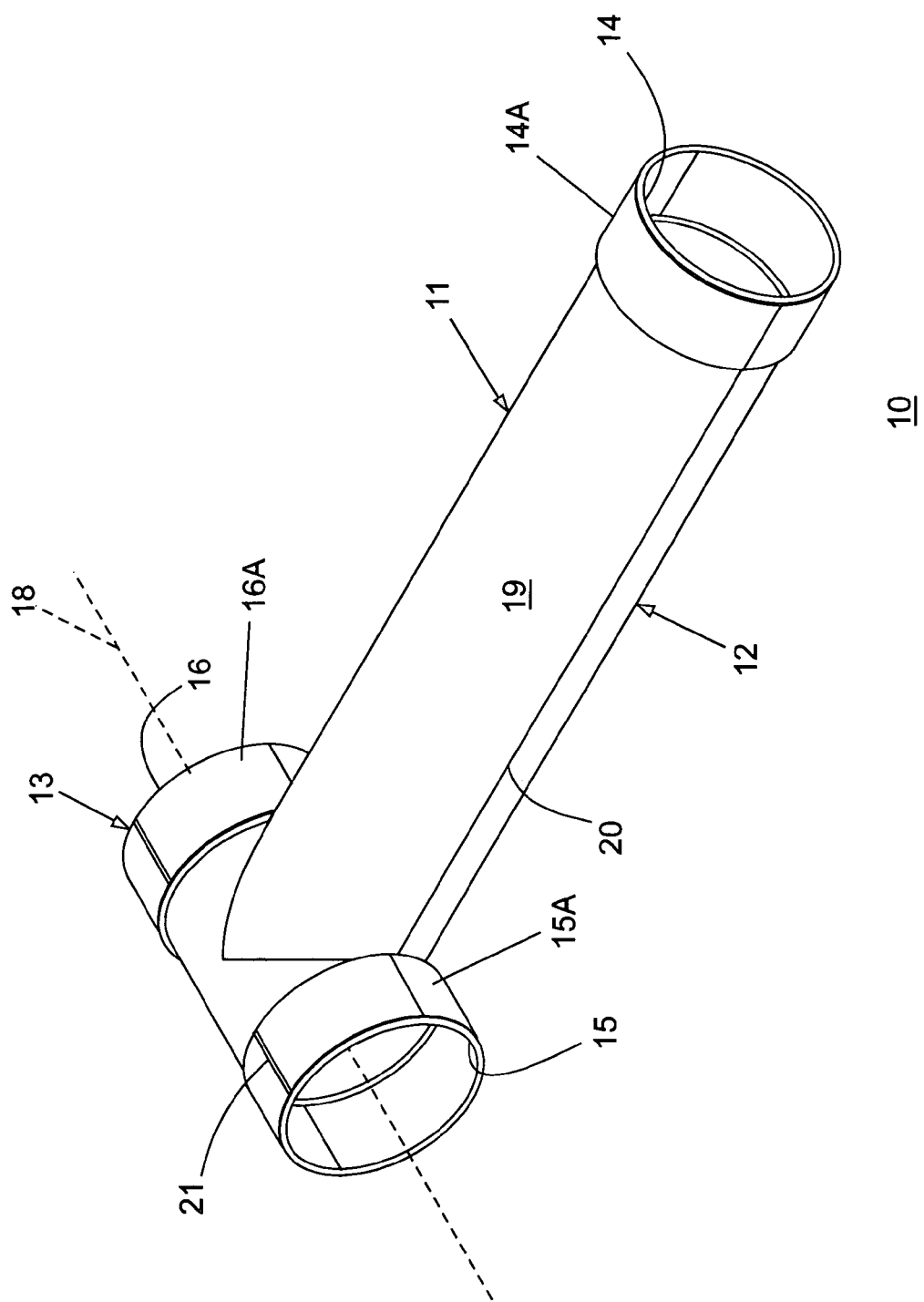
FIG. 1 is a top perspective view of the even-flow septic tee arrangement according to the invention.
Figure 2:
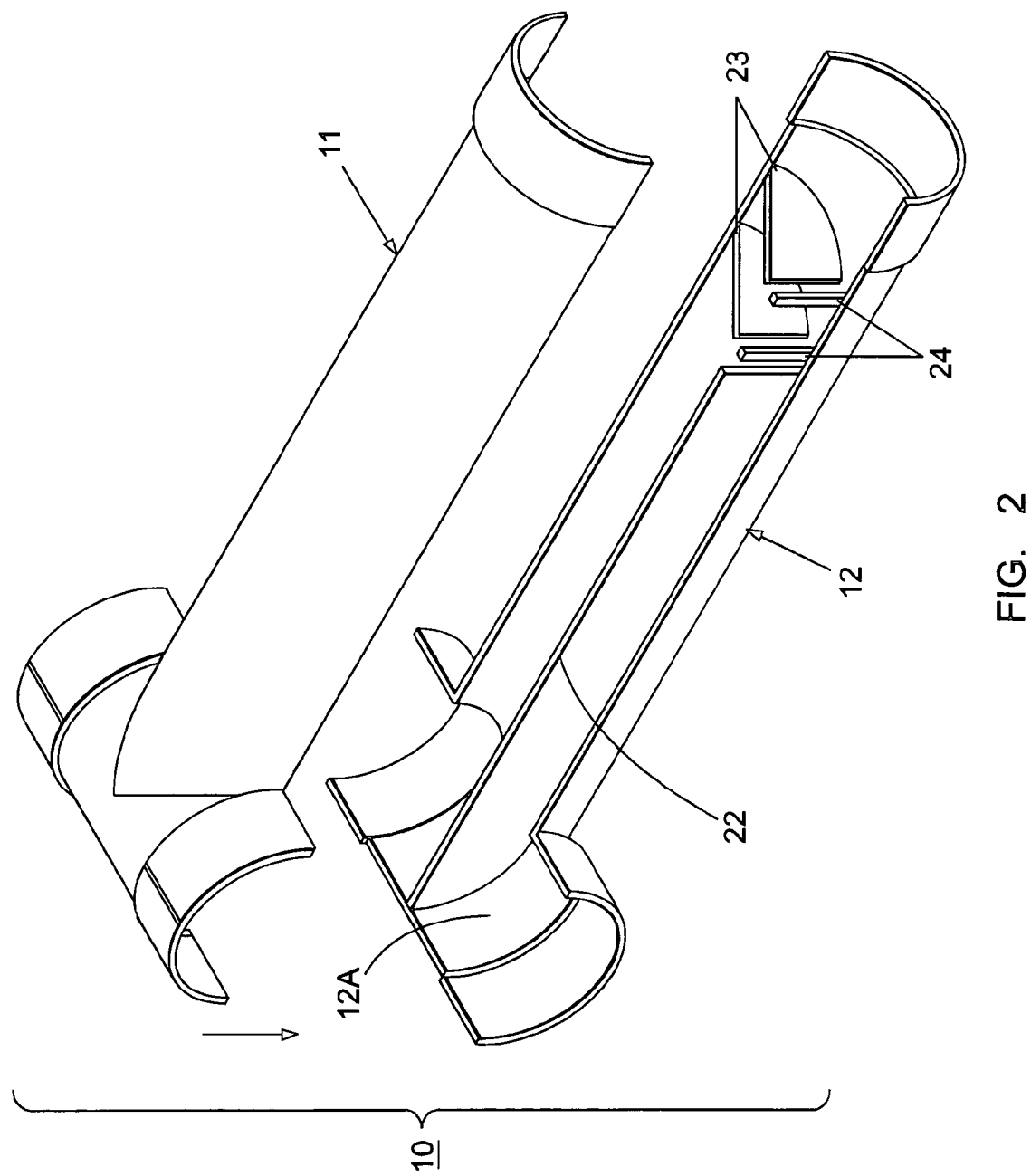
FIG. 2 is a top perspective view of the even-flow septic tee arrangement with the top section in isometric projection to the bottom section.

The even-flow septic tee 10 shown in FIGS. 1 and 2 consists of a top plate 11 and bottom plate 12 made of pvc (polyvinyl chloride) plastic material defining a tee-shaped outlet 13 at one end and a circular inlet opening 14 at the opposite end thereof. A level line 21 is formed on the top of the tee-shaped outlet 13 to assist in aligning the even-flow septic tee 10 with respect to the parallel plane 18, during installation.

The elongated even-flow septic tee 10 defines a linear section 19 roughly twice the length of the tee-shaped outlet 13 when the top and bottom plates 11, 12 are cemented together, as indicated at 20. The tee-shaped outlet 13 includes opposite side openings 15, 16 for fluid transfer out from the even-flow septic tee 10 in the manner to be described below in greater detail. Each of the openings 14–16 has enlarged collars 14A–16A for attachment with inlet and outlet piping as described in the aforementioned U.S. Pat. No. 6,012,871.

In accordance with the teachings of the invention, the even-flow septic tee 10 is shown in FIG. 2 prior to attaching the top plate 11 and bottom plate 12 wherein a splitter plate 22 is shown integrally-formed within the bottom 12A of the bottom plate 12 intermediate the opposite side openings 15, 16 and extending along the bottom plate 12 proximate the inlet opening 14 shown in FIG. 1. A pair of right flow directional vanes 23 is formed on the bottom 12A to the right of the end of the splitter plate 22 and a pair of left flow directional vanes 24 is formed on the bottom 12A to the left of the end of the splitter plate intermediate the end of the splitter plate and the inlet opening 14.

Figure 3:
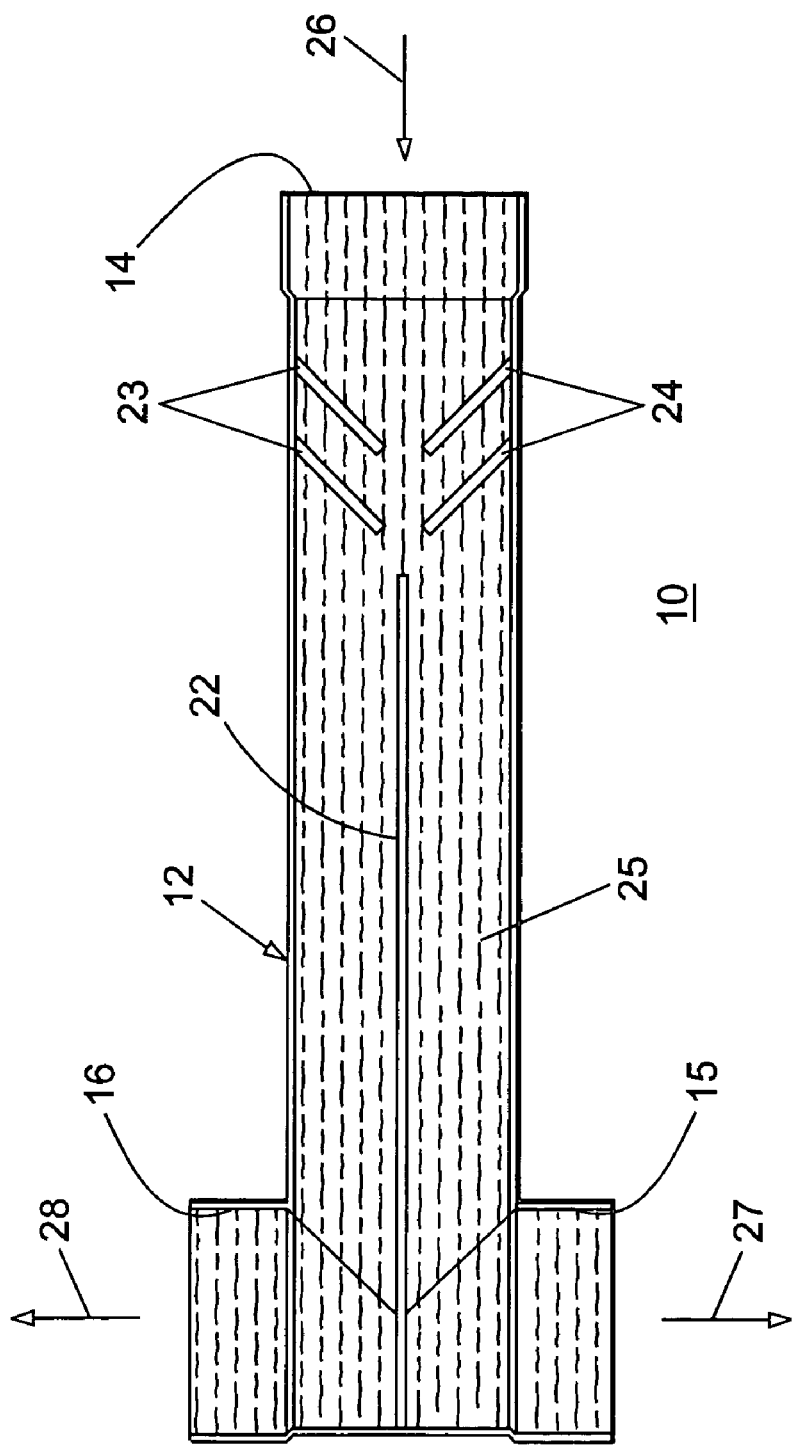
FIG. 3 is a top planar view, in partial section, of the bottom plate of the even-flow septic tee arrangement shown in FIG. 2 depicting fluid transfer.

The operation of the even-flow septic tee 10 is best understood by now referring to the even-flow septic tee 10 shown in FIG. 3 wherein the even-flow septic tee 10 is shown with the top plate 11 of FIG. 1 removed to depict the bottom plate 12 with fluid 25 transferring from into the inlet opening 14 and out of the opposite side openings 15, 16, as indicated by arrows 26–28 accordingly. The function of the right flow directional vanes 23 and left flow directional vanes 24 is to direct the flow of fluid 25 toward the middle of the splitter plate 22, which, in turn, divides the fluid flow equally outwards toward opposite side openings 15, 16, even when the level line 21 on the top of the tee-shaped outlet 13 in FIG. 1 is out of alignment with respect to the parallel plane 18, which often occurs in septic systems, due to a variety of reasons.

An elongated even-flow septic tee for connection between a holding tank and a distribution field in septic systems has herein been described. The even-flow septic tee includes means therein for compensating fluid flow distribution between the connecting distribution lines when the even-flow septic tee becomes displaced from the horizontal position of installation.

What is claimed is:

1. A connector between a septic tank and distribution field comprising:

an elongated tee having an inlet for connection with a septic tank, and a pair of outlets for connecting with a distribution field, said elongated tee includes a splitter plate arranged between said inlet and said outlets therein for dividing said fluid transfer between said pair of outlets and for providing fluid transfer thru said pair of outlets when said pair of outlets is off-set with a plane parallel with said distribution field and further including a first pair of deflecting vanes on one side of said splitter plate for directing said fluid flow to said one side of said splitter plate.

2. A connector between a septic tank and distribution field comprising:

an elongated tee having an inlet for connection with a septic tank, and a pair of outlets for connecting with a distribution field, said elongated tee includes a splitter plate arranged between said inlet and said outlets therein for dividing said fluid transfer between said pair of outlets and for providing fluid transfer thru said pair of outlets when said pair of outlets is off-set with a plane parallel with said distribution and a second pair of deflecting vanes on another side of said splitter plate for directing said fluid flow to said other side of said splitter plate.

3. A connector between a septic tank and distribution field comprising:

an elongated tee having an inlet for connection with a septic tank, and a pair of outlets for connecting with a distribution field, said elongated tee includes a splitter plate arranged between said inlet and said outlets therein for dividing said fluid transfer between said pair of outlets and for providing fluid transfer thru said pair of outlets when said pair of outlets is off-set with a plane parallel with said distribution field and further including a first pair of deflecting vanes on one side of said splitter plate for directing said fluid flow to said one side of said splitter plate and a second pair of deflecting vanes on another side of said splitter plate for directing said fluid flow to said other side of said splitter plate, wherein said first and second pair of deflecting vanes are proximate said inlet.

* * * * *